United States Patent [19]

Young et al.

[11] 4,193,130
[45] Mar. 11, 1980

[54] FIBER OPTIC HYDROPHONE FOR USE AS AN UNDERWATER ELECTROACOUSTIC STANDARD

[75] Inventors: A. Mark Young, Winter Park; Theodore A. Henriquez; Allan C. Tims, both of Orlando, all of Fla.

[73] Assignee: The United States of America as represented by the Secretary of the Navy, Washington, D.C.

[21] Appl. No.: 940,550

[22] Filed: Sep. 7, 1978

[51] Int. Cl.² .............................................. H04R 23/00
[52] U.S. Cl. ..................................... 367/149; 367/171; 367/172
[58] Field of Search .................................... 340/8–14; 350/96.29, 96.13

[56] References Cited

U.S. PATENT DOCUMENTS

| | | | |
|---|---|---|---|
| 3,025,359 | 3/1962 | Schilling et al. | 340/8 PC |
| 3,337,843 | 8/1967 | Kendig | 340/8 PC |
| 3,803,544 | 4/1974 | Wallen | 340/8 PC |
| 3,831,137 | 8/1974 | Cuomo | 340/13 |
| 3,903,496 | 9/1975 | Stimler | 340/13 R |
| 3,903,497 | 2/1975 | Stimler | 340/13 |

OTHER PUBLICATIONS

*Fiber-Optic Hydrophone* by J. A. Bucaro et al., J. Acoust. Soc. Am., vol. 62, No. 5, Nov. 1977, pp. 1302–1304.
*Fiber-Optic Detection of Sound* by J. H. Cole, R. L. Johnson and P. G. Bhuta, J. Acoust. Soc. Am., vol. 62, No. 5, Nov. 1977, pp. 1136–1138.

*Primary Examiner*—Harold I. Tudor
*Attorney, Agent, or Firm*—R. S. Sciascia; Philip Schneider; Melvin L. Crane

[57] ABSTRACT

A fiber optic hydrophone for use as an underwater electroacoustic standard. The hydrophone includes a fiber optic acoustic wave detector in one end of the hydrophone which is subjected to incident acoustical waves. A similar fiber optic is in an acoustically isolated compartment where the optic fiber is not affected by the incident acoustical wave. Comparison of light passing through each coil will determine incidence of an acoustical wave on the detector fiber.

7 Claims, 3 Drawing Figures

FIBER OPTIC HYDROPHONE FOR USE AS AN UNDERWATER ELECTROACOUSTIC STANDARD

BACKGROUND OF THE INVENTION

This invention relates to hydrophones and more particularly to an optical fiber hydrophone which is hydrostatic pressure and temperature-stable.

Heretofore acoustical transducers have been made of piezoelectric or magnetostrictive materials that function to receive acoustical signals and to convert them to an electrical signal or to convert an electrical signal to an acoustical signal. These prior-art transducers are useful throughout the different depths of the waters and have reached a stage of maturity in which further improvement in their operating characteristics have, for the most part, become limited by the available transduction materials.

Recently there has been patented U.S. Pat. No. (4,068,191) an acousto-optic modulator for optical fiber waveguides in which light passing through an optical fiber is modulated by an acousto-optic modulator which is in intimate contact with the optical fiber. Also, there has been reported in the literature single optical fiber interferometric acoustic sensors in which the optic fiber is in a straight line or in a coil. Suchsystems have been reported in the following articles: (1) "Optical Fiber Acoustic Sensor," by J. A. Bucaro, H. D. Dardy, and E. F. Carome, *Applied Optics*, Vol. 16, No. 7, pps. 1761-1762, July 1977. (2) "Fiber-optic Hydrophone," J. A. Bucaro and H. D. Dardy, *J. Acoustical Society of America*, Vol. 62, No. 5, pp 1303-1304, November 1977. (3) "Fiber-optic Detection of Sound," By J. H. Cole, R. L. Johnson and P. G. Bhuta, *J. Acoustical Society of America*, Vol. 62, No. 5, pp 1136-1138, November 1977. (4) "Single Fiber Interferometric Acoustic Sensor," by J. A. Bucaro and E. F. Carome, Applied Optics, Vol. 17, No. 3, pp 330-331, Feb. 1, 1978.

It is well known in the prior art that, when an acoustic wave propagates in a medium, the periodic variations in pressure cause corresponding periodic variations in the optical index of the medium. Thus, if a light beam is directed through a straight optic fiber or a coil and the optic fiber is subjected to an acoustic wave, the index of refraction of the optic fiber will be changed. As the index of refraction of the optic fiber changes, the phase of the light beam traversing the optic fiber will change. This phase change can be detected by an optical interferometer system in which a light beam is split into two equal path lengths, one path interacting with the acoustic field while the other is retained outside the field as a phase reference. The above-listed publications set forth such systems in which optical fibers are used to conduct a light beam in and out of the acoustic field. As the acoustic waves change the index of refraction of the optic fiber, the light passing through the optic fiber changes its phase. This phase change is proportional to the change in the index of refraction of the optic fiber, which is proportional to the incident acoustic wave. Therefore, the phase change in the light is a measure of the acoustic field incident on the optic fiber.

It is well known that the pressure and temperature of the surrounding water will also change the index of refraction of an optic fiber. Therefore, a light beam passing through an optic fiber is affected by pressure and temperature. In the prior-art systems, only the optic fiber within the medium is affected by the surrounding pressure and temperature. This leads to an inaccurate measure of an acoustic field due to the index-of-refraction change resulting from the pressure and temperature differences. This invention overcomes the problem by subjecting the sensor coil and reference coil to the same pressure and temperature conditions so there are no differences due to pressure and temperature.

SUMMARY OF THE INVENTION

The invention comprises a fiber optic hydrophone in which a sensor optic fiber coil and an isolated optic fiber coil are assembled within an acoustically transparent elastomer boot separated from each other and yet subjected to the same pressure and temperature changes so that the effects of these changes on the optic fiber will be balanced out.

DETAILED DESCRIPTION

Figure 1:
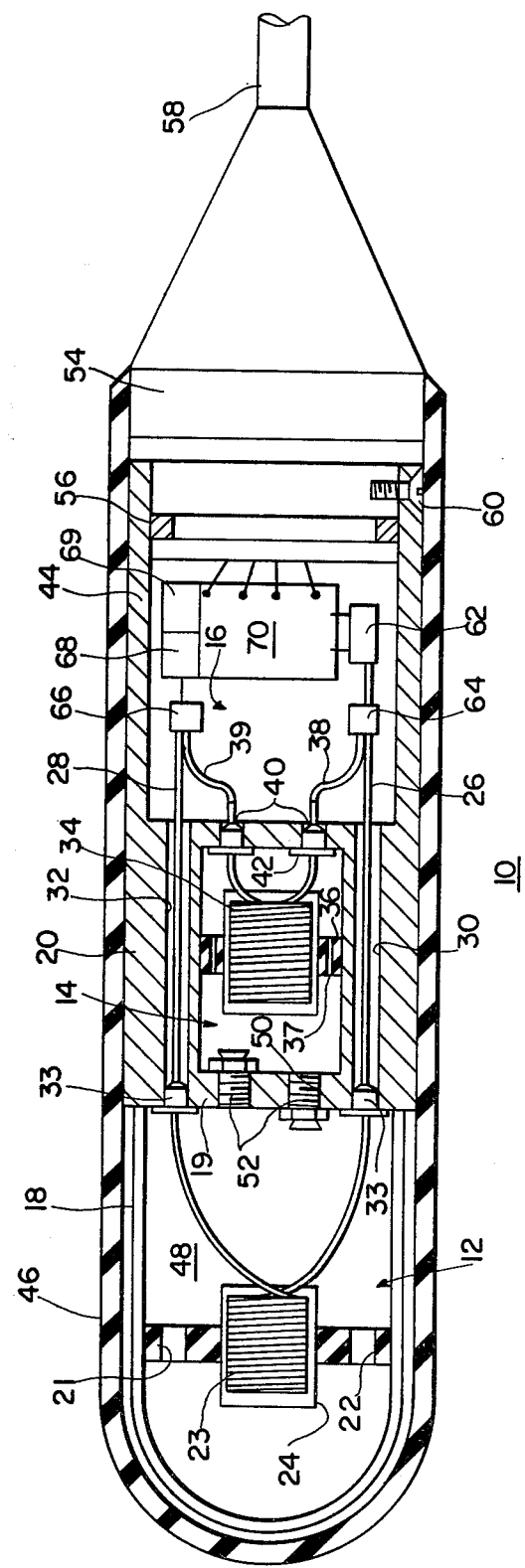
FIG. 1 is a partial cross-sectional view of a fiber optic hydrophone.

FIG. 1 is a partial cross-sectional view illustrating the relative parts of a fiber optic hydrophone 10. The hydrophone comprises three sections, a sensor fiber coil section 12, a centrally located reference fiber coil section 14, and an electronics section 16. The sensor fiber coil section contains a cage-like structure formed by rods or pipes 18 bent to form a rounded outer end with straight cylindrical portions connected at their ends to the adjacent end of a cylindrical housing 20 which extends along the reference fiber coil section. An elastomer mounting ring 21 having fluid flow-through apertures 22 therein is positioned within the cage-like housing near the center along the cage length.

Supported coaxially, within the mounting ring is an optic fiber sensor coil 23 wound with side-by-side aligned coils of equal diameter. The sensor coil is impregnated with an acoustically transparent elastomer 24 as the coil is wound so that the interstices of the coil are completely filled by the elastomer and contain no entrapped gases or voids. Impregnation of the coil is essential for optimum acoustic performance of the hydrophone. The exact dimensions inner and outer diameter of the fiber optic, the length, and configuration of the coil are dependent on the sensitivity and the omnidirectional bandwidth desired by the hydrophone. The upper limit of the coil diameter may be equal to one-half the wavelength of the acoustical wave to be detected, and the lower limit is dictated by the minimum radius of curvature that the particular optical fiber can withstand. The input end 26 and the output end 28 of the optical fiber coil extend through apertures 30 and 32 in the housing 20 to appropriate locations in the electronics end 16 of the hydrophone. Hermetic seals 33 are used to prevent leakage between the optical fiber and the apertures in the housing 20.

The cylindrical housing 20 has an acoustically opaque wall thick enough that the ends of the cage-like structure may be mounted on or secured to the adjacent end or partition 19 separating the sensor section from the reference section. The housing 20 is made of a metal such as stainless steel which is thick enough to acoustically isolate reference optical fiber coil 34 from the sensor coil 23. The reference coil has the same configuration and dimensions as those of the sensor coil. The coils of the reference coil is also elastomer-impregnated and mounted within an elastomer ring 36 in the same manner as the sensor coil. The elastomer ring 36 is provided with apertures 37 to permit fluid flow forward of the ring 36. The input end 38 and the output end 39 of the reference coil pass through apertures 40 in the forward end of the housing 20 and are sealed by hermetic seals 42 to avoid leakage around the ends of the coil. The housing 20 has a cylindrical portion 44 that encompasses the electronics section of the hydrophone which protects the electronics from the surrounding pressures. The housing 20 and cage-like end structure 18 are contained within an acoustically transparent boot 46. A gas-free fluid 48 fills the area around the sensor coil confined by the boot, and the area around the reference coil is filled with the same type fluid at the same pressure. The fluid can be castor oil, silicone oil, or any other convenient fluid which has an acoustic impedance at or near that of water which will not inhibit the optic fiber and will be compatible with the elastomers. The end of the housing 20 that separates the sensor coil section from the reference coil section is provided with at least two apertures 50, each containing a low-pressure "pop" valve 52 each of which open due to a pressure differential. One of the "pop" valves permits fluid flow from the sensor coil section to the reference coil section and the other permits fluid flow from the reference coil section to the sensor coil section. With equal pressures in each section, the valves will be closed. Thus the "pop" valves compensate for changes in hydrostatic pressure and temperature by permitting fluid flow from the reference section to the sensor section and from the sensor section to the reference section, depending upon which section has the greater pressure. The "pop" valves are closed when the pressures are equal therefore acoustical energy does not enter the reference section when the valves are closed.

The electronics section includes the optics and electronics necessary to make the hydrophone operative. The housing section 44 that surrounds the electronics section 16 is closed on the end by any conventional type hydrophone cable gland assembly 54 with the necessary O-ring seals 56 and cable 58. The cable gland is secured to the housing by suitable screws or bolts 60. The electronics section may include a laser or suitable light source 62 from which light is conducted to an optical waveguide or light-divider 64 which divides the light in half, directing 50% of the light into the input end 26 of the sensor optic fiber which directs that light to the sensor coil 23. The other 50% of the light is directed into the input end 38 of the reference coil, which directs that 50% of the light through the reference coil 34. The output end 28 of the sensor coil and the output end 39 of the reference coil are optically connected with an optical waveguide 66 or other optical device which will recombine the output light from the sensor coil with the output from the reference coil. The recombined light is detected by a photodetector 68. The resulting output signal in the photocurrent is processed by any well-known standard equipment 69 to determine the phase difference between the light passed through the sensor coil and that passed through the reference coil. The necessary electronic circuitry carried by the hydrophone is represented by box 70, and the remaining necessary electronics are connected from a ship, submarine, or other platform by electronic and or optic means through the cable 58.

It is obvious that the system could be made such that no electronics would be carried by the hydrophone. In this case, the necessary electrical wiring and light input and output optical fibers would be contained within the cable with the main electronics and optical devices carried by the ship, submarine, or any other platform. The electronics and optics necessary for operation of this system are well known in the art and have been set forth in the above listed publications.

In operation, the hydrophone is placed in a desired fluid medium so that the fluid surrounding the sensor coil is subjected to the pressure and temperature of the surrounding medium through the rubber boot. As the fluid surrounding the sensor coil is affected by the pressure and temperature of the surrounding medium, the fluid surrounding the reference coil will likewise be affected because the fluid can be transmitted from the sensor coil chamber to the reference coil chamber through the low-pressure "pop" valves 56 in the end of the housing 20 separating the sensor coil section from the reference coil section. Since the sensor coil and the reference coil are subjected to the same pressure and temperature, each of the coils will experience an equal change in its index of refraction due to the surrounding pressure and temperature. Therefore no phase difference will exist due to pressure and temperature and no difference due to pressure and temperature is detected by the light traversing the two coils. As the pressure of the fluid surrounding the sensor coil changes due to outside pressure, the low-pressure "pop" valves reset to permit fluid flow from or into the reference coil section to equalize the pressures in the two sections. Once the pressure is equalized, both "pop" valves will automatically close and there is no way that an acoustical wave can affect the reference coil since the reference coil is confined within an acoustically isolated chamber.

It is well known in the optical waveguide art that light passing through an optical fiber is affected by a change in the physical structure of the fiber and/or change in the index of refraction of the fiber. Further phase shift depends upon the product of the pressure and the interacting length. Each turn of the sensor coil is subjected to the pressure of an incident acoustical wave; therefore the index of refraction and diameter of each turn of the sensor coil will be changed due to the incident acoustic beam. Since the phase shift is dependent upon the product of the pressure applied to the fiber and the interaction length (which is the total turns), where will be sufficient change in the index of refraction to provide a measurable phase shift in the optical radiation passing through the sensor coil. Optical radiation, such as the output of a continous wave laser, is directed into an input optical fiber of the system; the input beam is divided in half with half of the light directed into the input fiber 26 of the sensor coil 23 and the other half directed into the input end of the reference coil 34. The optical radiation passing through the reference coil will pass through the coil without any change. However there will be a phase change in the radiation passing through the sensor coil due to the incident acoustical signal. The output radiation beams of the sensor coil and reference coil are optically combined to form an interference pattern which is probed by a photodetector. The resulting output of the photodetector is processed by any well-known prior art means to determine the phase difference in the output and therefore the presence of and amplitude of an acoustical wave incident on the sensor coil. Best results are obtained when the axis of the sensor coil is perpendicular to the direction of the acoustic wave.

Figure 2:
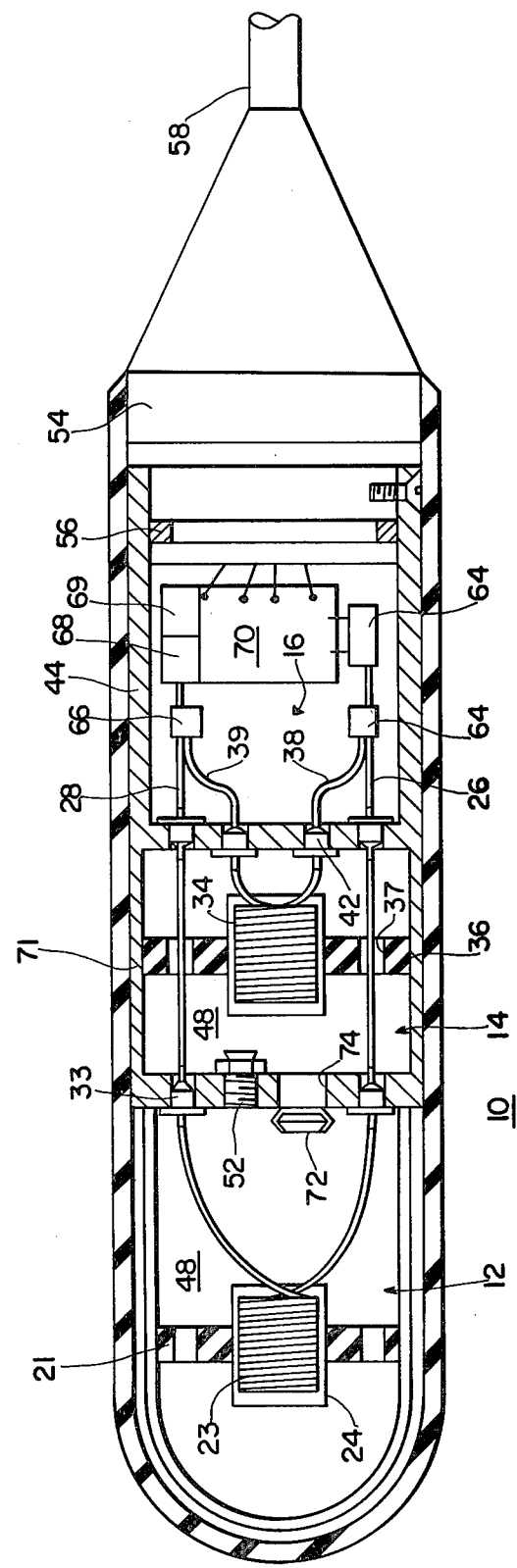
FIGS. 2 and 3 are modifications of the hydrophone shown by illustration in FIG. 1.

FIG. 2 illustrates a modification of the hydrophone structure shown in FIG. 1. In this modification, the structure is the same as for that of FIG. 1 except the wall 71 for housing the reference section 14 is made thin so that acoustically low frequencies may pass through the thin wall. Of course by making the housing wall thinner, the elastomer mounting ring 36 for the reference coil must be of greater diameter to secure the reference coil in place coaxially within the housing and so that the input and output fibers for the sensor coil may pass through the fluid flow apertures 37 in the mounting ring 36. Further modification may be made to provide a thin metal diaphram 72 or bellows in combination with an axial aperture 74 in the partition separating the sensor coil chamber and the reference coil chamber. The modification may include the thin housing wall change, or the diaphram change, or both. The purpose for this structural change is to provide an acoustical low-frequency roll-off at the optical input to the detector system to prevent low-frequency saturation of the detector. Since the structure retains the low-pressure "pop" valves, as in the structure of FIG. 1 there will be no change in the effect of any pressure and/or temperature difference on the sensor coil or the reference coil. The thin housing and/or bellows or diaphragm allows acoustical low frequency to pass into the reference coil chamber which will affect the index of refraction of the reference coil and thereby the phase of the light passing through the reference coil. As the acoustic frequency continues to decrease, the output differences between the sensor coil and the reference coil becomes less. At sufficiently low frequency, both the sensor coil and the reference coil begin to experience the same change in the index of refraction. Therefore there will be no detectable change in phase difference between the coils. Thus, the hydrophone sensitivity can be acoustically rolled-off at the input to the detector. The specific low-frequency roll-off is dependent on the ratios of the acoustic impedance of the media and the ratio of the housing thickness to that of the wavelength in the housing material. Thus, many different roll-off frequencies are possible.

Figure 3:
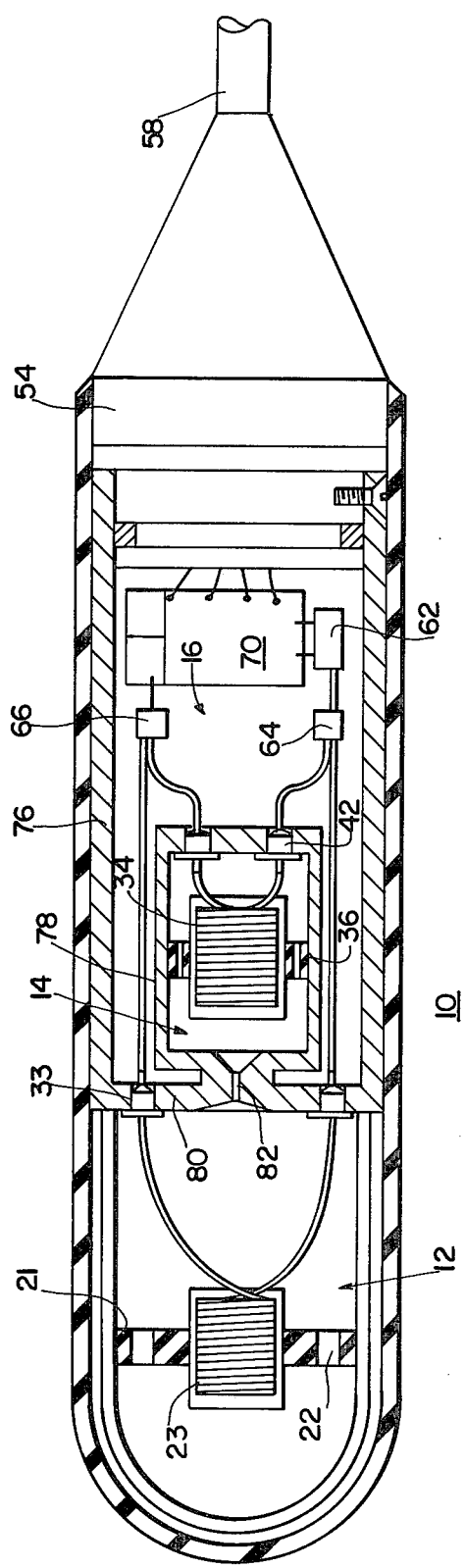

FIG. 3 illustrates a modification in which the reference section 14 and electronics section 16 are bounded by one common metal cylindrical housing 76. The reference coil 34 is contained within a compartment 78 within the common housing 76. The compartment 78 includes a gas-free fluid therein and joins the partition 80 between the sensor section and the reference section near the axis such that air within common housing 76 substantially surrounds the outer surfaces of reference coil compartment 78 except at its connection with the partition. The partition connection includes an axially aligned orifice 82 which interconnects the sensor coil chamber with the reference coil chamber. The orifice 82 permits fluid flow between the sensor coil chamber and the reference coil chamber 78. The orifice 82 permits good stability of the sensor coil and reference coil due to changes in hydrostatic pressure and temperature since the gas-free fluid in sensor end 12 is free to flow through the orifice between the sensor coil chamber and the reference coil chamber. Low-frequency acoustical roll-off is retained and controlled by acoustical impedance of the orifice. Since the reference coil chamber is air backed, which gives an extreme impedance mismatch to the acoustical signals in the media surrounding the hydrophone, low-frequency characteristics are determined by the orifice. At higher frequencies, the acoustic impedance of the orifice keeps the sound pressure from reaching the reference coil. As the frequency decreases, the acoustic impedance of the orifice becomes lower and sound pressure begins to enter the reference coil chamber to affect the reference fiber coil by changing the index of refraction thereof. At still lower frequencies, where the acoustic impedance of the orifice is very low, the reference coil and sensor coil experience the same acoustic pressure. At the low frequency at which each of the coil experiences the same acoustic pressure, the change in phase of the light through each coil will be the same resulting in no detectable difference in the outputs of the light paths. The acoustic pressure is not sensed and the hydrophone sensitivity is acoustically rolled-off at the input to the detector. The exact low-frequency roll-off can be controlled by the internal volume of the reference cavity, the viscosity of the fill fluid in the sensor and reference compartments the bulk modulus of the fill fluid, and the length and diameter of the orifice between the sensor coil chamber and the reference coil chamber.

Each of the modifications provides a hydrophone in which the effects of pressure and temperature are balanced-out between the sensor coil and reference coil since each of the coils is subjected to the same pressure and temperature changes. Also, in each of the illustrations shown, the reference coil is acoustically isolated from the sensor coil except at the low frequencies, as explained for the modifications shown in FIGS. 2 and 3.

It is to be noted that items such as screws, bolts, oil, fill holes, electronic circuitry, and the hardward necessary for assembly of the various parts have not been shown since they are within the preview of one skilled in the art.

Obviously many modifications and variations of the present invention are possible in light of the above teachings. It is, therefore to be understood that within the scope of the appended claims the invention may be practiced otherwise than as specifically described.

What is claimed and desired to be secured by Letters Patent of the United States is:

1. An acousto-optical, hydrostatic pressure and temperature-stable hydrophone comprising:

optical fiber, acoustical energy sensor means assembled within an acoustically transparent chamber;

optical fiber, acoustical energy reference means assembled within an acoustically isolated chamber in axial alignment with said acoustically transparent chamber, said acoustically transparent chamber and said acoustically isolated chamber including a fluid medium filling the space therein and having an acoustic impedance substantially the same as that of a medium in which said hydrophone is to operate;

acoustically opaque wall means for separating said acoustically transparent chamber from said acoustically isolated chamber; and means within said wall means for permitting fluid confined within and shared by said chambers to flow between said acoustically transparent chamber and said acoustically isolated chamber to maintain each of said chambers at the same operating pressure and temperature.

2. A hydrophone as claimed in claim 1 in which:

said optical fiber acoustical energy sensor means and said optical fiber reference means are each coils of the same dimensions.

3. A hydrophone as claimed in claim 2 in which:
said means for permitting fluid flow between said chambers are low-pressure "pop" valves.

4. A hydrophone as claimed in claim 2 in which:
said means for permitting fluid flow between said chambers is an orifice whose impedance at high frequencies prevents sound pressure from reaching said optical fiber reference means; and
said optical fiber reference means chamber is substantially surrounded with air.

5. A hydrophone as claimed in claim 3 in which: said optical fiber reference means chamber is of a thin cylindrical wall structure which permits acoustical signals at low frequencies to pass through to said optical fiber reference means.

6. A hydrophone as claimed in claim 2 which includes:
a thin metal diaphragm in an aperture in said wall means separating said acoustically transparent chamber from said acoustically isolated chamber.

7. A hydrophone as claimed in claim 5 which includes:
a thin metal diaphragm in an aperture in said wall means separating said acoustically transparent chamber from said acoustically isolated chamber.

* * * * *